US010225847B2

United States Patent
Chae et al.

(10) Patent No.: US 10,225,847 B2
(45) Date of Patent: Mar. 5, 2019

(54) METHOD AND DEVICE FOR TRANSMITTING/RECEIVING D2D SIGNAL CONSIDERING PRIORITY IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/563,923

(22) PCT Filed: Apr. 11, 2016

(86) PCT No.: PCT/KR2016/003786
§ 371 (c)(1),
(2) Date: Oct. 2, 2017

(87) PCT Pub. No.: WO2016/163848
PCT Pub. Date: Oct. 13, 2016

(65) Prior Publication Data
US 2018/0132254 A1     May 10, 2018

Related U.S. Application Data

(60) Provisional application No. 62/251,093, filed on Nov. 4, 2015, provisional application No. 62/209,335, filed
(Continued)

(51) Int. Cl.
*H04L 29/08* (2006.01)
*H04W 72/02* (2009.01)
(Continued)

(52) U.S. Cl.
CPC ........... *H04W 72/10* (2013.01); *H04W 72/02* (2013.01); *H04W 72/0453* (2013.01);
(Continued)

(58) Field of Classification Search
CPC ..... H04W 72/10; H04W 76/14; H04W 72/02; H04W 72/0453; H04W 72/06;
(Continued)

(56) References Cited

U.S. PATENT DOCUMENTS

2013/0148566 A1   6/2013  Doppler et al.
2014/0153390 A1*  6/2014  Ishii .................. H04W 28/0289
                                                                370/230
(Continued)

FOREIGN PATENT DOCUMENTS

WO   WO 2013/191360    * 12/2013
WO      2015021185       2/2015
(Continued)

OTHER PUBLICATIONS

3GPP TS 36.304 V8.5.0 (Mar. 2003) (Year: 2009).*
(Continued)

*Primary Examiner* — Christopher R Crompton
(74) *Attorney, Agent, or Firm* — Lee, Hong, Degerman, Kang & Waimey PC

(57) ABSTRACT

One embodiment of the present invention is a method for a first terminal transmitting/receiving a D2D signal in a wireless communication system, the method for transmitting/receiving a D2D signal comprising the steps of: receiving a D2D control signal transmitted by a second terminal; determining a priority of the second terminal through the D2D control signal; and if the priority of the second terminal is higher than a priority of the first terminal, and if resource regions overlap, the resource regions being indicated by a D2D control signal transmitted by the first terminal and the (Continued)

D2D control signal transmitted by the second terminal respectively, then then the first terminal performing protection of the resource region indicated by the D2D control signal of the second terminal.

15 Claims, 11 Drawing Sheets

Related U.S. Application Data on Aug. 24, 2015, provisional application No. 62/204,428, filed on Aug. 12, 2015, provisional application No. 62/174,540, filed on Jun. 12, 2015, provisional application No. 62/149,522, filed on Apr. 18, 2015, provisional application No. 62/146,207, filed on Apr. 10, 2015.

(51) Int. Cl.
*H04W 72/04* (2009.01)
*H04W 72/06* (2009.01)
*H04W 72/10* (2009.01)
*H04W 72/12* (2009.01)
*H04W 76/14* (2018.01)

(52) U.S. Cl.
CPC ....... *H04W 72/06* (2013.01); *H04W 72/1247* (2013.01); *H04W 76/14* (2018.02); *H04L 67/12* (2013.01); *H04W 72/0446* (2013.01); *H04W 72/121* (2013.01); *H04W 72/1278* (2013.01)

(58) Field of Classification Search
CPC ........... H04W 72/1247; H04W 72/044; H04W 72/121; H04W 72/1278; H04L 67/12
USPC ....................................................... 370/329
See application file for complete search history.

(56) References Cited

U.S. PATENT DOCUMENTS

| | | | |
|---|---|---|---|
| 2014/0321377 A1 | 10/2014 | Ryu et al. | |
| 2015/0045018 A1 | 2/2015 | Liu et al. | |
| 2016/0219541 A1* | 7/2016 | Chatterjee | H04W 76/18 |
| 2017/0048908 A1* | 2/2017 | Matsumoto | H04W 76/14 |
| 2017/0150480 A1* | 5/2017 | Kim | H04W 72/02 |
| 2017/0230959 A1* | 8/2017 | Wu | H04W 72/048 |
| 2018/0020339 A1* | 1/2018 | Agiwal | H04W 76/14 |

FOREIGN PATENT DOCUMENTS

| | | | |
|---|---|---|---|
| WO | WO 2015/115791 | * | 8/2015 |
| WO | 2016022849 | | 2/2016 |

OTHER PUBLICATIONS

D2D Resource Pool and Scheduling Assignments (Apr. 2014) (Year: 2014).*
Discussion on resource allocation for D2D synchronization (Apr. 2014) (Year: 2014).*
Enhancements for Efficient Relaying Operations (Aug. 2013) (Year: 2013).*
On Scheduling Assignments and Receiver Behaviour (Apr. 2014) (Year: 2014).*
On the Resource Pool Configuration for D2D Communications (Feb. 2014) (Year: 2014).*
Physical Channels Design for D2D (Nov. 2013) (Year: 2013).*
Resource Pool Configuration for Partial Coverage Scenarios (Feb. 2014) (Year: 2014).*
On Resource Allocation and System Operation for D2D Discovery (Oct. 2013) (Year: 2013).*
Scheduling-based D2D Communication Resource Allocation (Apr. 2014) (Year: 2014).*
Timing Aspects in D2D Discovery and Communication (Apr. 2014) (Year: 2014).*
PCT International Application No. PCT/KR2016/003786, Written Opinion of the International Searching Authority dated Jul. 26, 2016, 15 pages.
QUALCOMM, "ProSe Group Priority", SA WG2 Meeting #108, S2-150892, Apr. 2015, 7 pages.
Intel, "Further Details of D2D TX/RX Behavior", 3GPP TSG RAN WG1 Meeting #80, R1-150233, Feb. 2015, 5 pages.
CATT, "On D2D resource collision", 3GPP TSG RAN WG1 Meeting #79, R1-144613, Nov. 2014, 4 pages.
European Patent Office Application Serial No. 16776951.2, Search Report dated Nov. 6, 2018, 13 pages.
Shao, et al., "A multi-priority supported medium access control in Vehicular Ad Hoc Networks", Computer Communications, Nov. 2013, 12 pages.
Kakaraparthi, et al., "Efficient Message Scheduling in Ad hoc Networks", Wireless Communications and Networking Conference, Sep. 2000, 6 pages.
Intel Corporation, "On Overlap of Multiple D2D Resource Pools and UE Behavior", R1-144652, 3GPP TSG RAN WG1 Meeting #79, Nov. 2014, 6 pages.
Nokia Corporation, et al., "Further discussion on scheduling assignments", R1-143246, 3GPP TSG-RAN WG1 Meeting #78, Aug. 2014, 4 pages.

* cited by examiner (a)

(b)

(a)

(b)

(a)

(b)

METHOD AND DEVICE FOR TRANSMITTING/RECEIVING D2D SIGNAL CONSIDERING PRIORITY IN WIRELESS COMMUNICATION SYSTEM

CROSS-REFERENCE TO RELATED APPLICATIONS

This application is the National Stage filing under 35 U.S.C. 371 of International Application No. PCT/KR2016/003786, filed on Apr. 11, 2016, which claims the benefit of U.S. Provisional Application Nos. 62/146,207, filed on Apr. 10, 2015, 62/149,522, filed on Apr. 18, 2015, 62/174,540, filed on Jun. 12, 2015, 62/204,428, filed on Aug. 12, 2015, 62/209,335, Aug. 24, 2015 and 62/251,093, filed on Nov. 4, 2015, the contents of which are all hereby incorporated by reference herein in their entirety.

TECHNICAL FIELD

Following description relates to a wireless communication system, and more particularly, to a method for a D2D terminal or a relay to transmit and receive a signal in consideration of a priority and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

A technical task of the present invention is to provide a method for a specific group or a specific transmitter to more smoothly perform transmission/reception compared to a different UE or a UE group by assigning a higher priority to the specific group or the specific transmitter.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving a D2D signal, which is transmitted and received by a first UE in a wireless communication system, includes the steps of receiving a D2D control signal transmitted by a second UE, determining a priority of the second UE through the D2D control signal, and wherein if the priority of the second UE is higher than a priority of the first UE and a resource region indicated by a D2D control signal transmitted by the first UE is overlapped with a resource region indicated by the D2D control signal transmitted by the second UE, performing protection on the resource region indicated by the D2D control signal of the second UE by the first UE.

To further achieve these and other advantages and in accordance with the purpose of the present invention, according to a different embodiment, a first UE transmitting and receiving a D2D signal in a wireless communication system includes a transmitter and a receiver, and a processor, the processor configured to receive a D2D control signal transmitted by a second UE, the processor configured to determine a priority of the second UE through the D2D control signal, the processor, wherein if the priority of the second UE is higher than a priority of the first UE and a resource region indicated by a D2D control signal transmitted by the first UE is overlapped with a resource region indicated by the D2D control signal transmitted by the second UE, configured to perform protection on the resource region indicated by the D2D control signal of the second UE by the first UE.

The first UE can drop a transmission in the resource region indicated by the D2D control signal of the first UE.

The first UE can reselect the resource region indicated by the D2D control signal of the first UE.

The first UE can exclude the resource region indicated by the D2D control signal of the second UE from a selection target when the first UE reselects the resource region.

A resource in which the first UE transmits the D2D control signal and a resource in which the second UE transmits the D2D control signal may not be overlapped with each other.

A resource pool including the resource region indicated by the D2D control signal of the first UE may be identical to a resource pool including the resource region indicated by the D2D control signal of the second UE.

If the first UE and the second UE correspond to a V2X (vehicle to everything) UE, a priority of an event triggered-based message may be higher than a priority of a periodic message.

If a message size to be transmitted by the second UE is smaller than a message size to be transmitted by the first UE, the priority of the second UE may be higher than the priority of the first UE.

Advantageous Effects

According to the present invention, it is able to transmit and receive a D2D signal by reflecting a priority to the D2D signal while resource waste is minimized.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
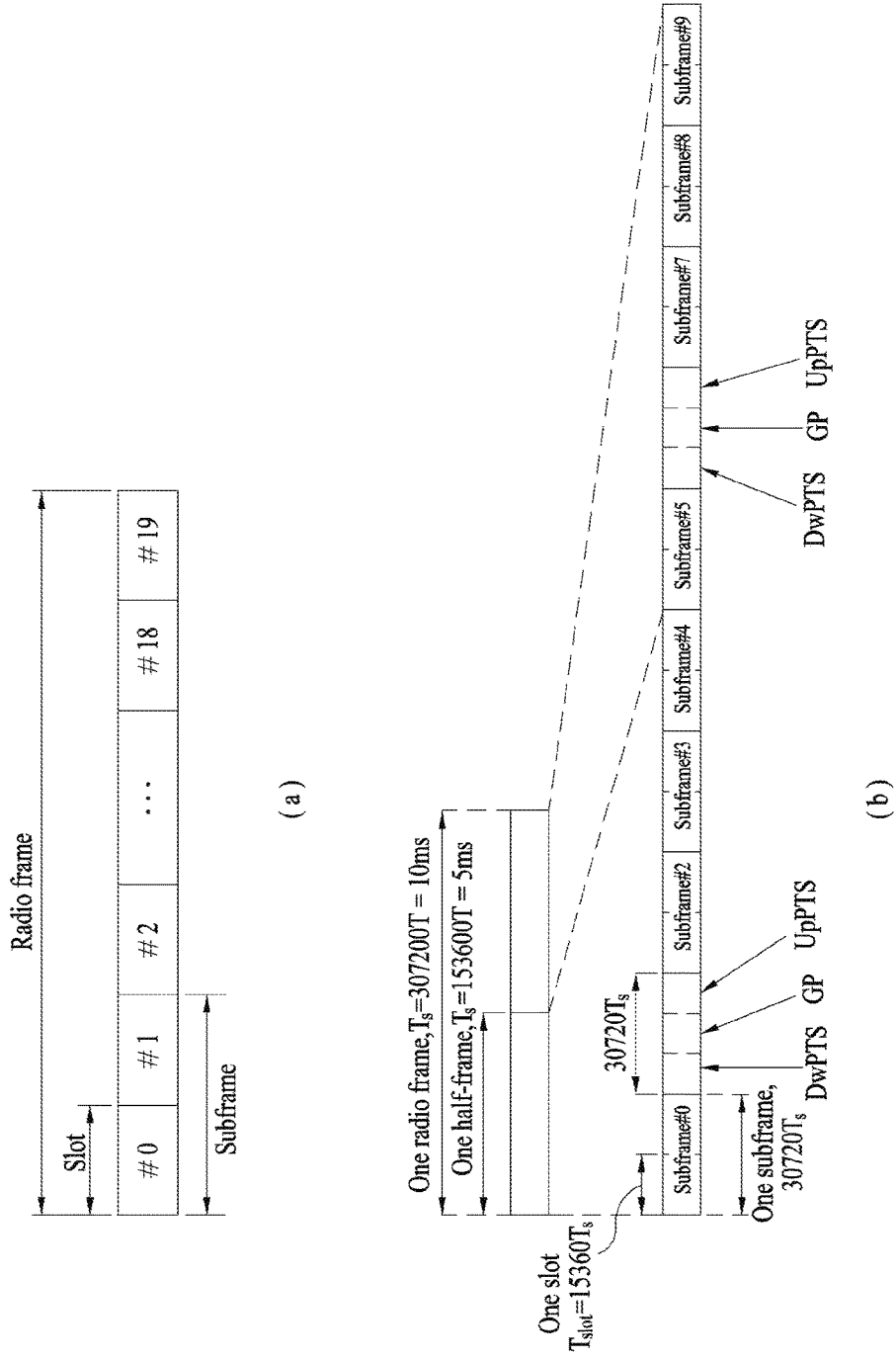
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
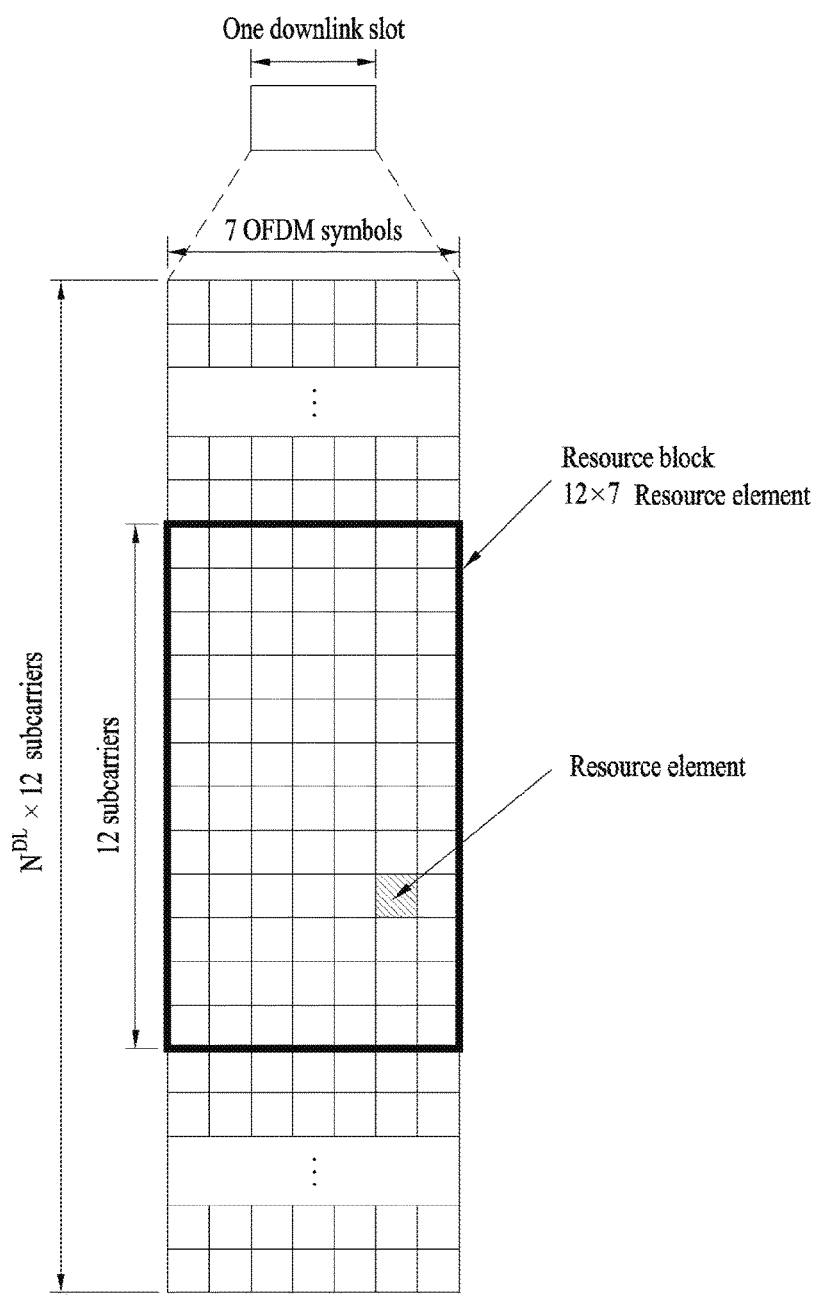
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
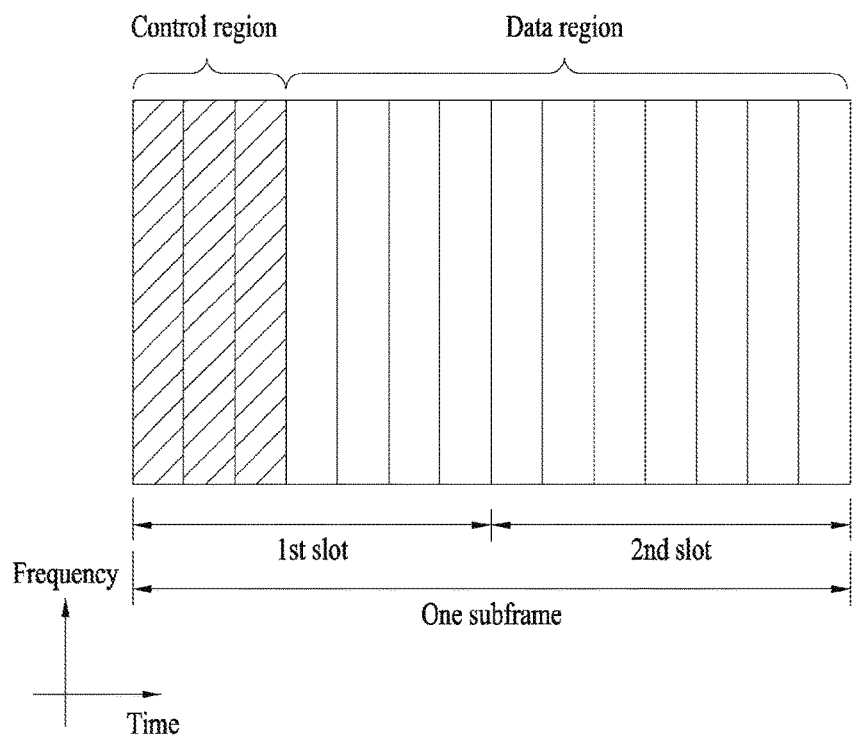
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
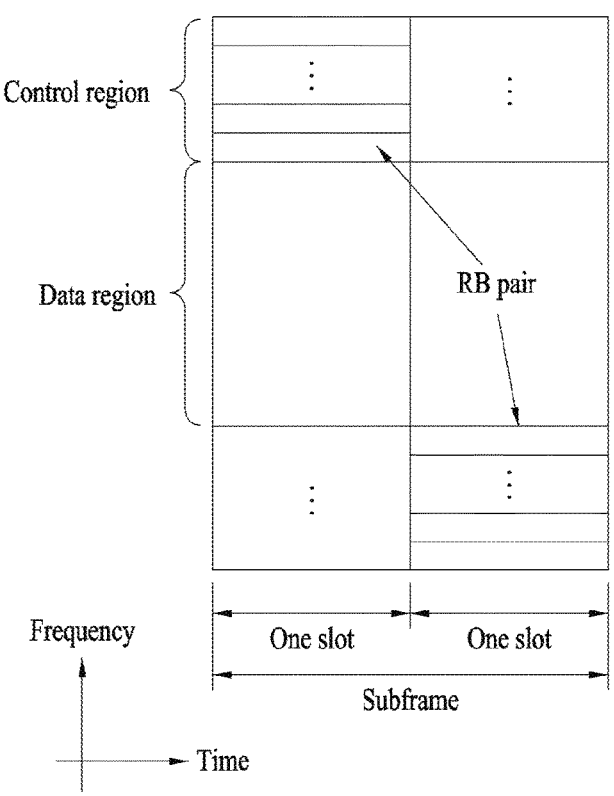
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
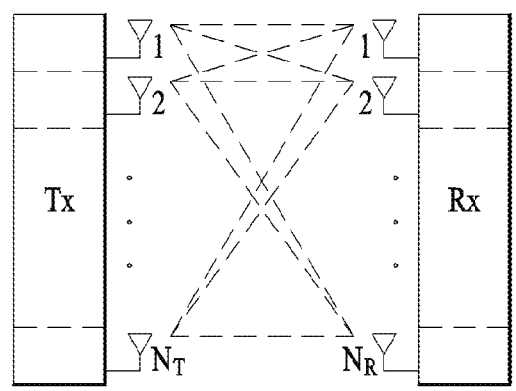
FIG. 5 is a diagram for a configuration of a wireless communication system having multiple antennas.
Figure 5:
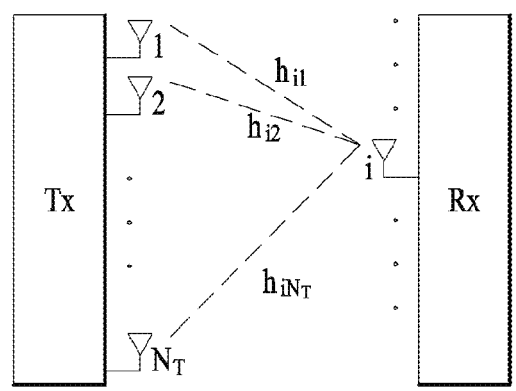

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
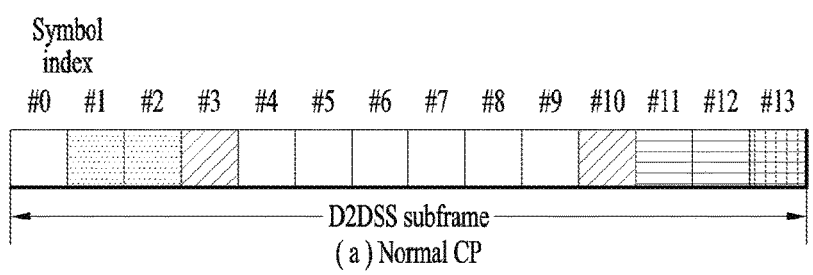
FIG. 6 is a diagram for a subframe in which a D2D synchronization signal is transmitted.
Figure 6:
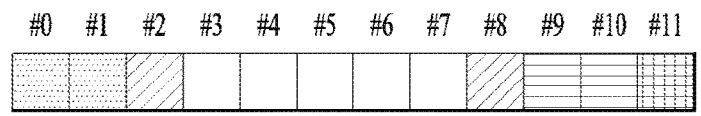

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
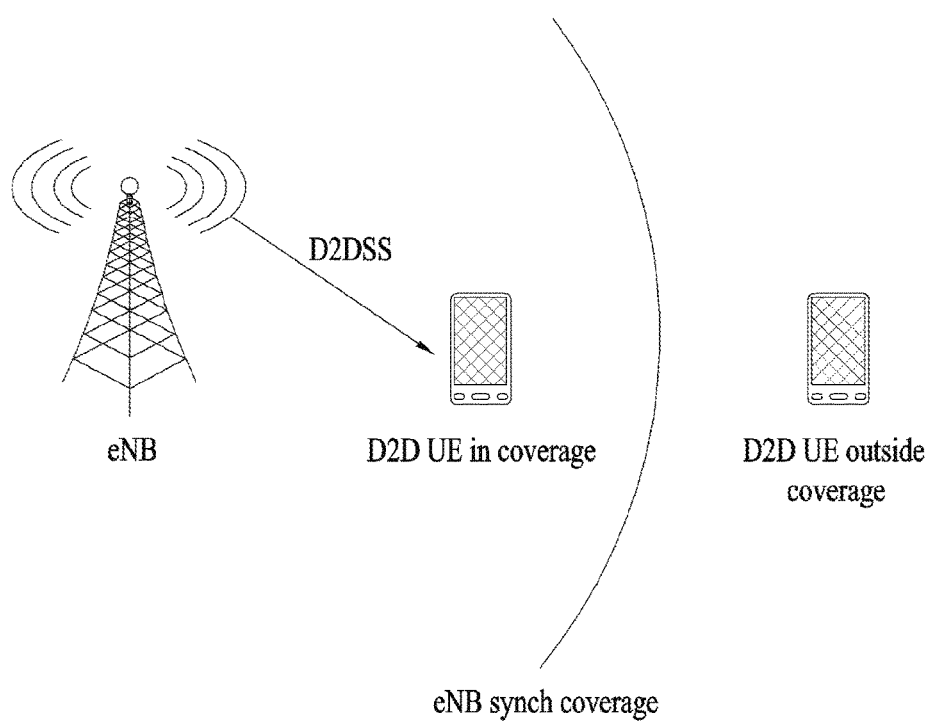
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
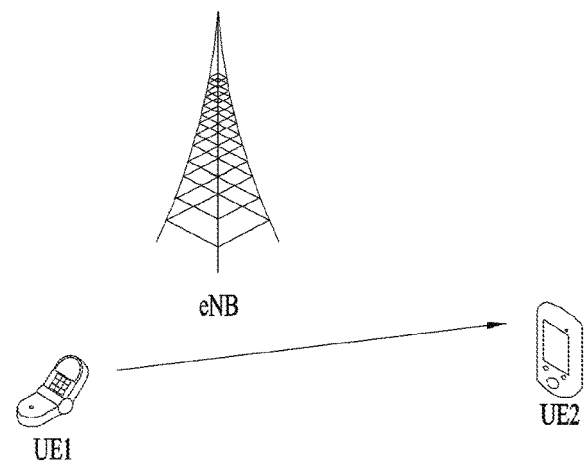
FIG. 8 is a diagram for an example of a D2D resource pool for performing D2D communication.
Figure 8:
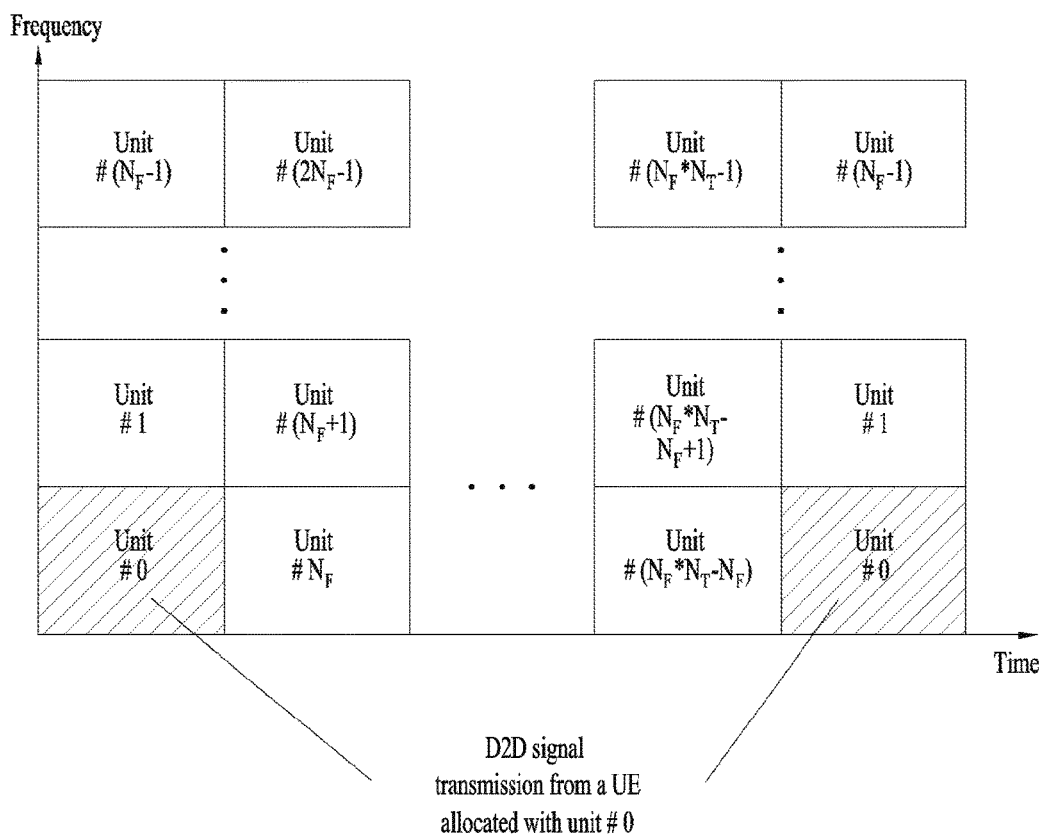

FIG. 8 shows an example of a UE1, a UE2 and a resource pool used by the UE1 and the UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal. can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
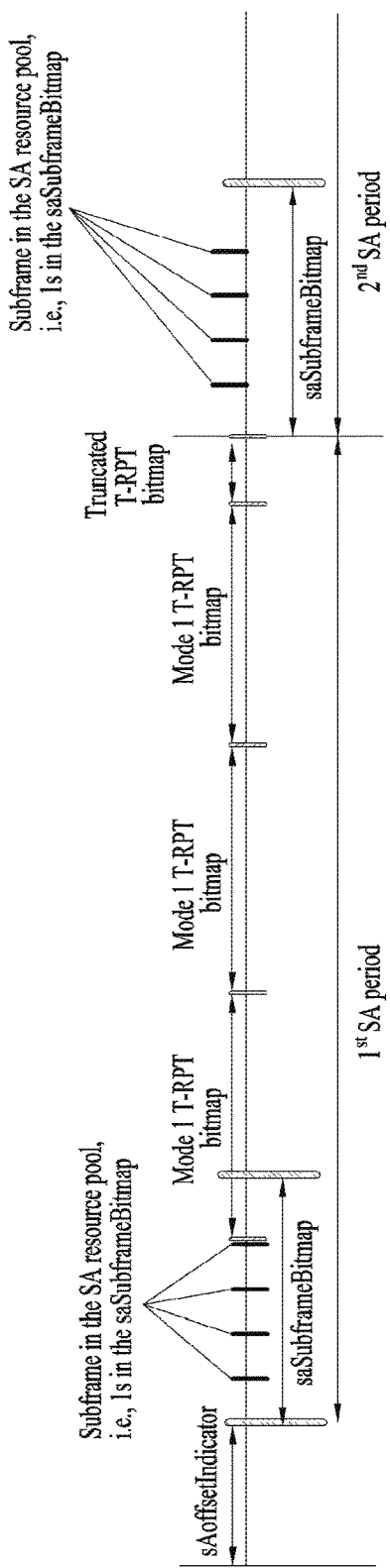
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. SA can indicate a transmission position of data using a T-RPT form or a different explicit method. For example, the SA may indicate a start point of data transmission, a repetition count, and the like. More generally, the SA corresponds to a channel configured to indicate a time/frequency position of a data transmission resource and the channel which is transmitted in a manner of including additional information necessary for decoding a data. Although the SA resource pool can be separated from a data pool, the SA resource pool may use a part of a data region together with the data pool in a manner of being overlapped with the data pool. And, the data pool and the SA resource pool can be separated from each other in frequency domain rather than time domain.

Meanwhile, in order to perform D2D communication, information on a time resource and a frequency resource is signaled on PSBCH and a reception UE performs D2D signal detection/decoding in an indicated resource. In this case, a pattern of a time resource (e.g., subframe) in which a D2D signal is transmitted is referred to as T-RPT (time resource pattern for transmission). A PSBCH format 0 signals T-RPT and a frequency resource position. In this case, according to 3GPP LTE release 12, the repetition count of a single MAC PDU is fixed by 4 and a redundancy version of a MAC PDU is transmitted by a fixed order such as 0→2→3→1.

In the following, a method for a specific group or a specific transmitter to more smoothly perform transmission/reception compared to a different UE or a UE group by assigning a higher priority to the specific group or the specific transmitter in D2D communication is explained. In the following description, when an eNB transmits a signal (physical layer signal) of a type used in D2D communication, the eNB can be regarded as a sort of UEs. In this case, the specific group may correspond to a specific terminal. For example, if a terminal operates as a relay, the terminal may have a priority higher than a priority of a different terminal. In the following description, SA is used as a meaning of a D2D control signal.

Embodiment 1

A first UE receives a D2D control signal transmitted by a second UE and may be able to determine a priority of the second UE through the D2D control signal. If the priority of the second UE is higher than a priority of the first UE and a resource region indicated by a D2D control signal transmitted by the first UE is overlapped with a resource region indicated by the D2D control signal transmitted by the second UE, the first UE can perform protection on the resource region indicated by the D2D control signal transmitted by the second UE. The protection performed by the first UE may correspond to dropping of a data transmission or avoidance of a resource selection when SA of a high priority UE is detected.

Specifically, the first UE can drop a transmission in the resource region indicated by the D2D control signal of the first UE. Or, the first UE can reselect the resource region indicated by the D2D control signal of the first UE. When the first UE reselects the resource region, the resource region indicated by the D2D control signal of the second UE can be excluded from selection targets. In particular, when a low priority UE detects SA of a high priority UE, the low priority UE can perform resource selection on resource regions except a time/frequency resource region of the high priority UE. In this case, a time/frequency resource including extension of a partial frequency periphery can be excluded from resource selection targets in consideration of a specific subframe transmitted by the high priority UE, time/frequency, or in-band emission. And, it may be able to anticipate the amount of interference using the in-band emission. If energy as much as XdB is measured in a specific frequency resource region of a specific subframe, it may be able to select a resource with reference to the measured energy by anticipating the amount of in-band emission (e.g., (X-30)dB) in a different frequency resource region. When a signal of a different UE is examined in a plurality of subframes, it may be able to anticipate the amount of interference by considering not only a frequency resource at which the signal of the UE is measured but also in-band emission caused by the UE. By doing so, it may be able to select a resource of less interference amount. In particular, if a UE detects SA transmitted by a UE of the same priority or a UE of higher priority, the UE performs resource selection on resources except the resource of less interference amount and reflects the resource to resource indication when SA of the UE is transmitted.

A priority of a UE can be indicated not only by SA but also by a data transmitted thereafter. In this case, if a D2D transmission UE receives a signal of a UE of a user/group/packet priority higher than that of the D2D transmission UE (and, if preemption is requested), the D2D transmission UE can terminate a data transmission in a corresponding SA period. However, since the SA period has already informed reception UEs of data transmission by transmitting the SA, the SA period can terminate the SA and the data transmission in a next SA period after the data transmission is completed.

In the foregoing description, in relation to a priority, if the first UE and the second UE correspond to a V2X (vehicle to everything) UE, a priority of an event triggered-based message may be higher than a priority of a periodic message. In particular, this can be interpreted as the event triggered-based message is transmitted in V2X. In this case, it can be regarded as the priority of the event triggered-based message is higher than the priority of the periodic message. To this end, an SA pool for the event triggered-based message may precede an SA pool for the periodic message in time.

Or, if a size of a message to be transmitted by the second UE is smaller than a size of a message to be transmitted by the first UE, a priority of the second UE may be higher than a priority of the first UE. In this case, it may have an effect of reducing resource fragmentation. When UEs intends to transmit a message of a small size, if the UEs preoccupy a resource, it is highly probable that it fails to secure a resource for a message of a big size due to fragmentation of a resource. It may be able to use not only a priority between the event triggered-based message and the periodic message but also a priority of messages included in the event triggered-based message or the periodic message. For example, a message of a big size can be transmitted with a priority higher than a priority of a periodic message by including a security message among period messages. To this end, a field indicating a priority can be included in SA or data. Or, an SA pool can be divided according to a priority of each message. Although messages of a low priority have the same type (periodic/event triggered-based), the priority of the messages can be divided again according to a message size or a type of contents included in the messages. When a message of a low priority is transmitted, it may perform resource selection by excluding a resource region in which a resource selected by a higher priority or a surrounding part of a resource including the resource selected by the higher priority is included.

Figure 10:
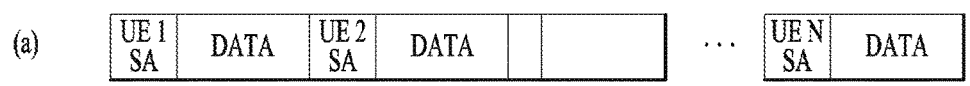
FIGS. 10 to 11 are diagrams for explaining embodiments of the present invention.
Figure 10:
Figure 11:
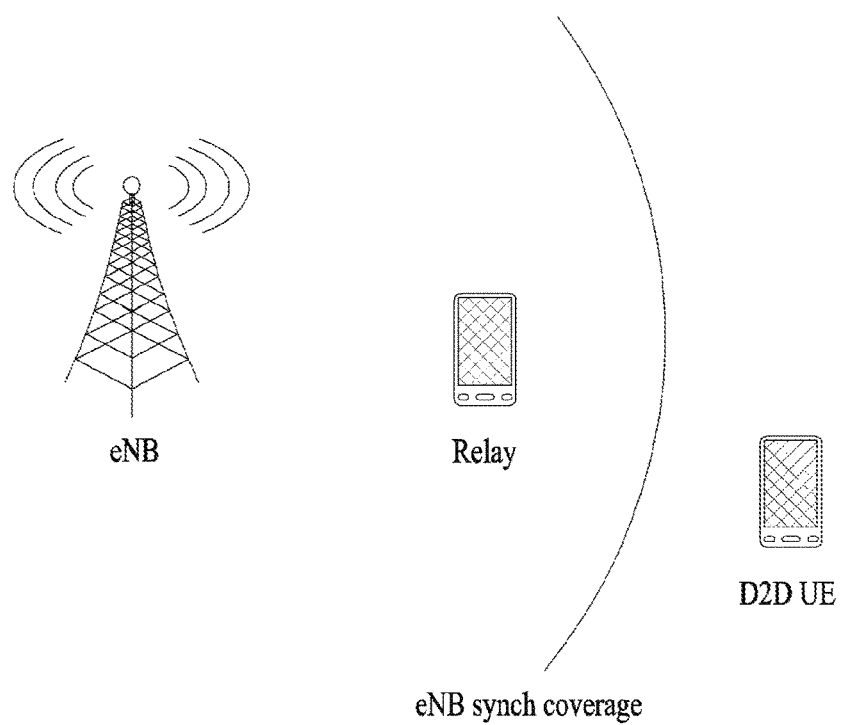

In the foregoing description, a resource in which a D2D control signal of the first UE is transmitted is not overlapped with a resource in which a D2D control signal of the second UE is transmitted. A resource pool including a resource region indicated by the D2D control signal of the first UE is identical to a resource pool including a resource region indicated by the D2D control signal of the second UE. In particular, although the resource region indicated by the D2D control signal of the first UE is overlapped with the resource region indicated by the D2D control signal of the second UE, resources in which each UE transmits SA are not overlapped with each other. In particular, FIG. 10(a) shows SA and resources respectively divided for a plurality of UEs. On the contrary, FIG. 10(b) shows that SA resource is divided into resources for UEs of a different priority and there is a common resource pool for data.

Embodiment 2

Figure 12:
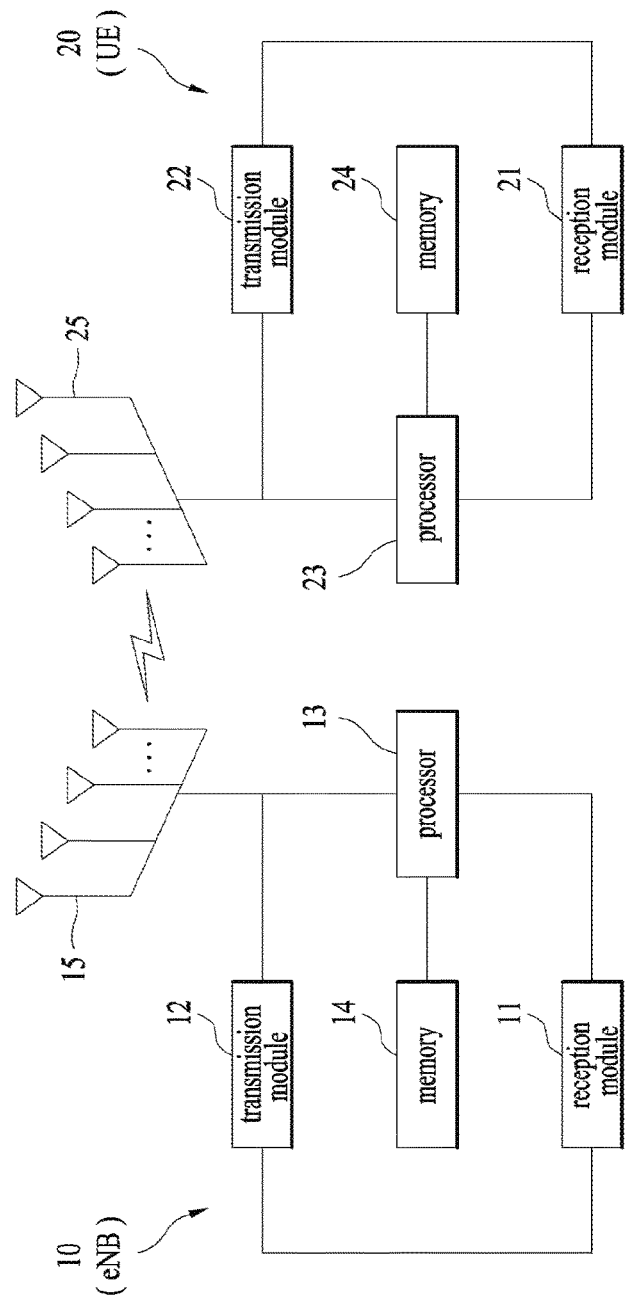
FIG. 12 is a diagram for configurations of a transmitter and a receiver.

As shown in FIG. 12, if there are a relay UE and a D2D UE and the relay UE uses a mode 1, data is continuously transmitted during T-RPT indicated by SA within an SA period. When a partial region of a mode 1 resource pool is configured as a mode 2 resource pool used by a remote UE, if the relay UE transmits data in the partial region, the relay UE may fail to receive a signal of the remote UE due to a half-duplex problem. In this case, it is necessary to configure transmission not to be performed in a subframe at which the mode 2 pool used by the remote UE exists among the mode 1 resource pool. To this end, it may use methods described in the following.

Embodiment 2-1

An eNB can signal a start point and an end point of a transmission within an SA period via physical layer signaling or higher layer signaling. For example, the eNB can signal termination of a mode 1 transmission when a mode 2 resource pool starts within an SA period of the mode 1. Or, if a data pool of the mode 2 is positioned at a partial subframe of a data transmission start region of the mode 1, the eNB can signal information on the signal transmission timing of the mode 1 resource pool via physical layer signaling or higher layer signaling.

Embodiment 2-2

It may be able to determine a rule that a mode 1 UE does not perform transmission in a subframe overlapped with a pool in which a remote UE performs transmission among a mode 2 resource pool. In this case, it may be able to determine a rule that transmission is not performed not only in a data region but also in a subframe where an SA pool exists. Although the mode 1 UE transmits a signal, if a subframe in which SA of a mode 2 is transmitted is emptied out, it may be able to more stably receive a signal transmitted by the remote UE. Or, although data is received by best effort, it may be able to determine a rule that D2D transmission is to be terminated in an SA pool of the mode 2 to enable the SA of the mode 2 to be mandatorily received.

Embodiment 2-3

It may be able to determine a rule that the mode 1 UE does not perform transmission in a subframe overlapped with a subframe transmitted by the remote UE. A difference between the embodiment 2-2 and the embodiment 2-3 is to terminate transmission in the subframe transmitted by the remote UE only in the mode 2 resource pool rather than all subframes of the mode 2 resource pool.

Embodiment 2-4

In order to make the remote UE smoothly receive a signal of the relay UE, it may be able to determine a rule that transmission is not performed in a subframe overlapped with an SA pool of the relay UE. According to 3GPP LTE release 12 D2D, 4 resource pools can be set to the remote UE. In order to receive mode 1 data of the relay UE, one of the 4 resource pools should be aligned with a mode 1 resource pool. In this case, if a different resource pool is overlapped with the mode 1 resource pool, i.e., an SA pool of the mode 1, it may be able to determine a rule that transmission is to be terminated.

The abovementioned operation can be restrictively performed only when the remote UE performs transmission. Or, the operation can be performed all the time when the relay UE operates in the mode 1 or a D2D UE operates in the mode 1.

The proposed method can also be applied to a case that pools between mode 2 are overlapped in time domain. If the relay UE performs transmission in a specific pool of the mode 2, the remote UE performs transmission in a different mode 2 resource pool. In this case, if a subframe transmitted by the remote UE is overlapped with a subframe transmitted by the relay UE, it may be able to determine a rule that the remote UE or the relay UE does not perform transmission. And, one of avoidance methods between the mode 1 and the mode 2 can also be applied between mode 2 resource pools.

The abovementioned operation can also be applied to a case that a specific UE performs transmission in both the mode 1 and the mode 2. For example, when the specific UE performs a relaying operation in the mode 1, performs group communication in the mode 2, or performs the group communication/relaying operation in the mode 1/mode 2, if transmission subframes are overlapped in the two modes, one of the proposed methods can be used.

Similarly, when a specific UE performs transmission in a plurality of pools in the mode 2, if overlap occurs in time domain, it may prioritize a specific pool. In this case, a group priority, a packet priority, or a user priority can be associated with a pool and a resource of a high priority pool can be preferentially transmitted. If transmission or reception is performed in a high priority resource, it may skip transmission or reception in a low priority pool.

In the foregoing description, a discovery pool of the relay UE and a discovery pool of the remote UE can be configured by a period identical to periods of SA and data pools. In this case, it may be able to determine a rule that a mode 1 UE does not perform transmission in the discovery pool of the remote UE. More generally, it may apply one of the methods.

Embodiment 3

It may be able to apply a priority according to an SA period. In particular, the embodiment 3 corresponds to a method of dividing resources according to the SA period. Since priorities are divided in advance according to the SA period, it may be able to determine a rule that SA and data are transmitted only when a priority is equal to or higher than a priority threshold/condition assigned to the SA. According to the present method, a priority threshold or a priority range capable of being transmitted according to a period can be determined in advance according to an SA period or can be signaled by a network. A UE can transmit SA/data only when a user/packet/group priority condition of the UE is satisfied according to an SA period. In summary, as a method of putting a user/packet/group priority according to an SA period, it may consider a method of dynamically determining a priority after a signal of a different UE is detected and a method of determining a group priority according to an SA period. A network can signal an available priority condition/level to D2D UEs according to an SA period via physical layer signaling or higher layer signaling. Or, a priority condition/level according to an SA period can be determined in advance.

Embodiment 4

Meanwhile, when a specific UE suddenly performs communication such as an MCPTT (mission critical push to talk) service (including video/data service), other UEs may detect and stop the service via SA. In particular, when a UE performing the MCPTT service, a top priority UE, or a UE having a packet/user/group priority higher than a priority of a UE currently performing communication in a D2D resource region (hereinafter, for clarity, a higher priority MCPTT UE) transmits SA, the UE may use an ID interlocked with a predetermined priority or configure a specific field of the SA by a predetermined value to notify that the UE suddenly transmits important information. Having received the information, D2D transmission UEs of a priority lower than the priority of the higher priority MCPTT UE can terminate D2D transmission in a corresponding SA period although the D2D transmission UEs have transmitted the SA. Or, the D2D transmission UEs can drop transmission only when a time/frequency resource transmitted by the D2D transmission UEs is overlapped with a resource transmitted by the higher priority MCPTT UE. Or, it may be able to determine a rule that the D2D transmission UEs drops transmission only when a subframe transmitted by the D2D transmission UEs is overlapped with a subframe transmitted by the higher priority MCPTT UE. Or, when a Tx UE performs transmission and reception at the same time due to half-duplex, the Tx UE is unable to receive an MCPTT signal. Hence, the Tx UE is able to drop transmission in a corresponding subframe.

If the SA of the higher priority MCPTT UE is detected, a group of D2D reception UEs of a priority lower than a priority of the higher priority MCPTT UE can also anticipate that data is not transmitted in a subframe indicated by SA of the group. Or, if a resource transmitted by an MCPTT UE is overlapped with a resource of a signal to be received by a D2D UE (belonging to the same group or SA ID configured by a group of the D2D UE) in time/frequency or a time axis, the D2D UE can anticipate that the signal to be received by the D2D UE is not transmitted. This scheme prevents interference of a neighboring UE from being occurred when an authorized UE disseminates a specific message to neighboring UEs in an urgent situation such as MCPTT. Hence, it may be able to reliably transmit an urgent message. Meanwhile, this method is not restricted to an MCPTT UE. In general, when a signal of high priority is transmitted, the method can be used as a method for neighboring other UEs to protect the signal of high priority.

Embodiment 5

When a UE performs transmission with a high priority, a D2D signal can be transmitted to the UE with higher transmit power. To this end, a separate power control parameter (P0, alpha) can be configured by a network for a corresponding UE or a UE group. Or, a UE specific power control parameter offset (UE specific P0 offset and/or UE specific alpha offset) can be configured by the network. For example, if a UE specific P0 offset value is set to a UE operating as a relay, it may be able to configure the UE to perform transmission with power higher than power of a different D2D UE.

Embodiment 6

T-RPT subset used by a specific UE or a UE group can be restricted to a specific set in advance. In particular, T-RPT restriction is applied. For example, it may be able to configure a UE of a high priority level to use T-RPT of a high transmission count (number (K) of 1's is big in T-RPT bitmap). Although it is able to directly set restriction on the T-RPT subset used by the specific UE or the specific UE group (T-RPT subset index capable of being used by a network is directly signaled to the specific UE or the UE group), it may signal an available K value to the specific UE or the UE group to reduce signaling amount. For example, a UE of a high priority level uses T-RPT of a big K value and a UE of a low priority level uses T-RPT of a small K value. In this case, since a D2D signal transmitted by the UE of high priority is transmitted for more time compared to a different D2D signal, a probability of receiving the D2D signal can be increased compared to a D2D signal of low priority (T-RPT of small K value). If a network UE-commonly signals T-RPT restriction, a separate UE specific or UE group specific signal can be signaled by the network according to a priority of a UE or a UE group.

Meanwhile, if the K value is simply configured to be big, a transmission count can be increased. Yet, since a transmission count of MAC PDU is fixed, it can be interpreted as a D2D packet is more quickly transmitted. In this case, it indicates that a D2D signal is transmitted with a higher transmission rate. In particular, the abovementioned operation is different from an operation of forwarding a signal with a high probability. Hence, when a higher K value is used according to a priority, it may be able to configure a repetition transmission count per MAC PDU to be increased as well according to the increase of the K value. To this end, a network can signal the K value and the repetition transmission count per MAC PDU together or the repetition transmission count per MAC PDU according to the K value can be determined in advance. If the repetition transmission count per MAC PDU changes, in order to inform a reception UE of the change, information for indicating the repetition transmission count per MAC PDU can be transmitted in a manner of being included in a partial region of SA (PSCCH) or a D2D communication packet. Or, it may be able to indicate the transmission count per MAC PDU using a separate SA format. (150411) Or, it may have a predetermined K value and/or a repetition transmission count per MAC PDU (interlocked with the K value or independent of the K value) according to a priority level. A UE selects the K value and the transmission count according to the priority level to transmit a D2D packet.

Meanwhile, having more resources in time domain according to a priority can be extended to frequency domain. For example, a size of a frequency resource capable of being selected from a resource pool can be configured according to a priority. Or, frequency resource regions capable of being selected can be divided according to a priority. The division of the frequency resource regions according to the priority can be determined in a manner of being interlocked with T-RPT. In particular, more time resources and more frequency resources can be allocated to a group of high priority.

Embodiment 7

If a resource pool is divided into a plurality of logical channels, each UE group can use a different logical channel. In this case, the logical channels can be assigned by a network via physical layer signaling or higher layer signaling. Specifically, the network can signal information on a bitmap and/or frequency resource for setting restriction on a subframe and/or frequency resource region capable of being used in a resource pool to a specific UE or a specific UE group. The logical channels can be distinguished from each other in time domain to mitigate half-duplex constraint by distinguishing UEs having a different priority from each other in time domain. In particular, a signal of a UE or a UE group of high priority is distinguished from signals of other UEs in time domain to more smoothly receive the signal. For example, when a specific resource pool is configured, it may be able to configure a resource pool bitmap used by a specific UE or a UE group and a resource pool bitmap used by a different UE or UE group not to set a bit value 1 at the same position.

More generally speaking, resources used by UEs of a different priority are distinguished from each other in time domain (or frequency domain) and data pool/SA pool, and the like are divided again in the time domain according to a priority. In this case, it is preferable that a resource of a high priority is arranged to the forepart of the time domain to make UEs of a low priority perform an avoidance operation. Although this concept can be regarded as a priority level interlocked with each resource pool, it may also indicate that SA and/or data pool is distinguished from each other in time on the basis of a size of a message without such a concept as a priority. For example, an SA pool transmitted by a UE including a message of a big size is distinguished from an SA pool transmitted by a UE including a message of a small size in time domain. In particular, if the SA pool transmitted by the UE including the message of a big size is preferentially arranged, the UE including the message of a small size may operate by avoiding a resource region transmitted by the UE including the message of big size. If the SA pool transmitted by the UE including the message of small size is preferentially arranged, since many data pools are already fragmented by a small message size, it is difficult for the UE including the message of big size to avoid the fragmented data pools.

Meanwhile, it may prioritize a synchronization source interlocked with a signal of high priority to configure the synchronization source as a timing reference. In this case, it may be able to determine a rule that the synchronization (source) is changed only when measurement of a discovery signal (e.g., reception strength of a DMRS) is equal to or greater than a prescribed threshold. In this case, the threshold for the discovery measurement can be configured in advance or can be signaled by a network. This scheme can be used for prioritizing synchronization of a relay that transmits a signal of a high priority level when an OON UE detects a plurality of relays. Or, this scheme can be used for prioritizing synchronization of an MCPTT relay rather a different relay in a special situation. To this end, a field indicating whether a relay UE corresponds to a one-to-one UE or an MBMS or broadcast/multicast relay can be included in a discovery signal of the relay UE. In general, a signal indicating a priority of a relay can be transmitted in a manner of being included in the discovery signal. Similarly, other D2D UEs can transmit a signal indicating a priority as well.

It may also consider a priority when SA is transmitted. For example, when SA is transmitted, as mentioned earlier in the embodiment 5, it may apply an offset to transmit power according to a priority. Or, it may set repetition to the SA. For example, if an SA resource pool transmitted by a UE of a high priority is separately configured and a repetition count is configured by 2 in the SA resource pool to consider half duplex hopping scheme, transmission can be performed by 4 times. Or, if SA is transmitted in a legacy SA pool and a network configures a pool in which a UE of high priority additionally transmits SA, the UE of high priority can additionally transmit SA in the pool. In this case, the pool in which the SA is additionally transmitted and the legacy pool in which the SA is transmitted are interlocked with a data pool. In order to indicate this, it may be able to signal a data pool interlocked with the pool where the SA is additionally transmitted or the SA pool transmitted by the UEs of high priority.

If a destination group transmitted to the same UE is differentiated, a priority may vary. Hence, the proposed scheme may correspond to a priority for a group to which a UE belongs thereto. Yet, a priority can be determined according to a destination to be transmitted by a UE. In this case, it may follow the priority of the group to which the UE belongs thereto or the proposed methods may operate according to a priority of a currently transmitted destination group.

Among the aforementioned methods, a method of dividing a resource pool again in time domain can be used for the usage of distinguishing a resource transmitted by a relay UE from a resource transmitted by an OON UE. This is because, since it is unable to receive a signal transmitted by the OON UE in the resource transmitted by the relay UE, it is preferable that the resources are distinguished from each other in the time domain. As a method of indicating a subframe resource used by a relay UE in a resource pool, it may consider methods described in the following.

It may set restriction on T-RPT of the relay UE. And, in this case, a OON (out of network) receiving the T-RPT used by the relay UE can select the T-RPT only from among subsets of a reverse bitmap of the T-RPT of the relay UE. For example, if the relay UE uses T-RPT corresponding to 11110000, the OON UE selects T-RPT such as 00001111 to transmit a D2D signal. In this case, it is not necessary for the OON UE to perform transmission at positions of all 1's in a reverse T-RPT bitmap of the relay UE. As an extension of the abovementioned scheme, it may configure subsets in the T-RPT bitmap of the relay UE and perform logical OR calculation between the T-RPT subsets of the relay UE to define a generated bitmap. This is referred to as 'restricted T-RPT bitmap union'. For example, when 10010000, 01100000, 1010000, and 01010000 correspond to the T-RPT bitmap subsets of the relay UE, if the logical OR calculation is performed on the subsets, it may be able to generate such a bitmap as 11110000. This bitmap becomes the restricted T-RPT bitmap union of the relay UE. The remaining OON UEs select T-RPT from among subsets of a reverse (e.g., 00001111) of the restricted T-RPT bitmap union. To this end, the restricted T-RPT bitmap union is determined in advance or signaled via PSBCH in the resource pool transmitted by the relay UE. Having received the restricted T-RPT bitmap union, the OON UE transmits a D2D signal using a subset of the restricted T-RPT bitmap union transmitted by the relay UE.

The restriction of the T-RPT used by the relay UE can be represented in a group resource bitmap form among the proposed methods. In particular, a resource pool bitmap used by a specific UE or UE group is configured in a resource pool and the remaining UEs do not perform transmission in a subframe corresponding to a position of 1 of the resource pool bitmap.

Meanwhile, although the T-RPT subset restriction of the relay UE can be semi-statically configured by configuring the T-RPT subset restriction of the relay UE according to a resource pool, it may be able to indicate that the relay UE performs transmission via physical layer signaling or higher layer signaling of a separate D2D signal. As an example of the physical layer signaling, when the relay UE transmits SA, the relay UE configures a DMRS CS to be different from a DMRS CS of a different UE. Hence, if a UE receives the DMRS CS of the relay UE, the UE is able to know that the relay UE performs transmission. Subsequently, the UE identifies T-RPT of SA and selects the T-RPT from among exclusive T-RPTs in time domain.

As a different scheme, it may be able to configure an ID of the relay UE to be different from an ID of a different UE. The ID of the relay UE is configured using a specific ID to make the ID indicate the relay UE. Having received the specific ID, UEs are able to know that the relay UE has transmitted a corresponding SA.

As a further different scheme, it may be able to configure SA or a CRC mask of data of the relay UE to be different from that of a different UE. The SA or the CRC mask of data transmitted by the relay UE is masked using a predetermined ID or a relay UE-specific ID. Having received the predetermined ID or the relay UE-specific ID, a UE is able to know that the relay UE has transmitted the SA or the D2D data.

As a further different scheme, it may be able to make a different UE know a transmission T-RPT of the relay UE via a higher layer D2D signal of the relay UE.

Meanwhile, in the present invention, an operation of prioritizing a specific UE/packet/group may correspond to a function not applied to a legacy UE or a UE not supporting prioritization. In this case, if the legacy UE and a UE supporting prioritization perform transmission in a single resource region, since the legacy UE may provide interference to the UE supporting prioritization or the legacy UE may ignore a request of the UE supporting prioritization, it may be difficult to properly perform a prioritization operation. In order to solve this, a method of distinguishing a resource region used by the UE supporting the prioritization function from a resource region used by a UE not supporting the prioritization function is proposed. For example, while a 3GPP LTE release 12 D2D UE uses a first resource region, an LTE release 13 UE supporting the prioritization function uses resource regions from a second resource region. In particular, if the resources are distinguished from each other, the LTE release 13 UE can perform a prioritization operation without interference and interruption of the LTE release 12 UE.

If the LTE release 12 UE is also able to support the prioritization operation of the LTE release 13 UE in an application layer, the LTE release 12 UE and the LTE release 13 UE may use a common resource region. In this case, in order to transmit a request message to a different UE to ask the different UE to stop transmission and perform reception, a separate resource region can be allocated. Or, it may be able to preconfigure a corresponding UE or a UE transmitting the message to use a specific T-RPT or a T-RPT subset only in a resource region. Or, a network can signal the configuration. If a resource region is allocated by transmitting the request message, excessive resource occupation may occur and it may lead to resource waste. Hence, if it is configured to use a specific T-RPT/T-RPT subset for a UE or a specific UE transmitting the message in the resource region, it may be able to have a merit in terms of resource efficiency.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

FIG. 12 is a diagram for configurations of a transmitter and a receiver.

Referring to FIG. 12, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 12, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 12 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting and receiving a D2D signal, which is transmitted and received by a first UE in a wireless communication system, comprising the steps of:
   receiving a D2D control signal transmitted by a second UE;
   determining a priority of the second UE through the D2D control signal; and
   wherein if the priority of the second UE is higher than a priority of the first UE and a resource region indicated by a D2D control signal transmitted by the first UE is overlapped with a resource region indicated by the D2D control signal transmitted by the second UE, performing protection on the resource region indicated by the D2D control signal of the second UE by the first UE.

2. The method of claim 1, wherein the first UE drops a transmission in the resource region indicated by the D2D control signal of the first UE.

3. The method of claim 1, wherein the first UE reselects the resource region indicated by the D2D control signal of the first UE.

4. The method of claim 3, wherein the first UE excludes the resource region indicated by the D2D control signal of the second UE from a selection target when the first UE reselects the resource region.

5. The method of claim 1, wherein a resource in which the first UE transmits the D2D control signal and a resource in which the second UE transmits the D2D control signal are not overlapped with each other.

6. The method of claim 5, wherein a resource pool including the resource region indicated by the D2D control signal of the first UE is identical to a resource pool including the resource region indicated by the D2D control signal of the second UE.

7. The method of claim 1, wherein if the first UE and the second UE correspond to a V2X (vehicle to everything) UE, a priority of an event triggered-based message is higher than a priority of a periodic message.

8. The method of claim 1, wherein if a message size to be transmitted by the second UE is smaller than a message size to be transmitted by the first UE, the priority of the second UE is higher than the priority of the first UE.

9. A first UE transmitting and receiving a D2D signal in a wireless communication system, comprising:
   a transmitter and a receiver; and
   a processor, the processor configured to receive a D2D control signal transmitted by a second UE, the processor configured to determine a priority of the second UE through the D2D control signal, the processor, wherein if the priority of the second UE is higher than a priority of the first UE and a resource region indicated by a D2D control signal transmitted by the first UE is overlapped with a resource region indicated by the D2D control signal transmitted by the second UE, configured to perform protection on the resource region indicated by the D2D control signal of the second UE by the first UE.

10. The first UE of claim 9, wherein the first UE drops a transmission in the resource region indicated by the D2D control signal of the first UE.

11. The first UE of claim 9, wherein the first UE reselects the resource region indicated by the D2D control signal of the first UE.

12. The first UE of claim 11, wherein the first UE excludes the resource region indicated by the D2D control signal of the second UE from a selection target when the first UE reselects the resource region.

13. The first UE of claim 9, wherein a resource in which the first UE transmits the D2D control signal and a resource in which the second UE transmits the D2D control signal are not overlapped with each other.

14. The first UE of claim 13, wherein a resource pool including the resource region indicated by the D2D control signal of the first UE is identical to a resource pool including the resource region indicated by the D2D control signal of the second UE.

15. The first UE of claim 9, wherein if the first UE and the second UE correspond to a V2X (vehicle to everything) UE, a priority of an event triggered-based message is higher than a priority of a periodic message.

* * * * *